United States Patent
Olijnyk et al.

(10) Patent No.: US 6,929,372 B2
(45) Date of Patent: Aug. 16, 2005

(54) POWER FOLD MECHANISM FOR DOUBLE ARM MIRRORS

(75) Inventors: Mark Olijnyk, Lonsdale (AU); Daniel Joseph Flynn, Morphett Vale (AU)

(73) Assignee: Schefenacker Vision Systems Australia Pty Ltd, Lonsdale (AU)

( * ) Notice: Subject to any disclaimer, the term of this patent is extended or adjusted under 35 U.S.C. 154(b) by 0 days.

(21) Appl. No.: 10/476,201

(22) PCT Filed: Apr. 29, 2002

(86) PCT No.: PCT/AU02/00517

§ 371 (c)(1),
(2), (4) Date: Oct. 24, 2003

(87) PCT Pub. No.: WO02/087922

PCT Pub. Date: Nov. 7, 2002

(65) Prior Publication Data

US 2004/0130813 A1 Jul. 8, 2004

(30) Foreign Application Priority Data

Apr. 27, 2001 (AU) .............................................. PR4613

(51) Int. Cl.[7] .......................... G02B 5/08; G02B 7/182; B60R 1/06
(52) U.S. Cl. ....................................... 359/841; 359/877
(58) Field of Search ................................. 359/841, 872, 359/877; 248/900

(56) References Cited

U.S. PATENT DOCUMENTS

| | | | |
|---|---|---|---|
| 4,558,930 A | * | 12/1985 | Deedreek |
| 5,375,014 A | | 12/1994 | Fujie et al. |
| 5,886,838 A | * | 3/1999 | Kuramoto |
| 5,926,331 A | | 7/1999 | Crandall |
| 5,940,230 A | | 8/1999 | Crandall |
| 6,116,743 A | * | 9/2000 | Hoek |
| 6,239,928 B1 | | 5/2001 | Whitehead et al. |
| 6,243,218 B1 | | 6/2001 | Whitehead |
| 6,276,805 B1 | * | 8/2001 | Home et al. |
| 6,276,808 B1 | * | 8/2001 | Foote et al. |
| 6,276,821 B1 | | 8/2001 | Pastrick et al. |
| 6,312,135 B1 | | 11/2001 | Polzer |
| 6,322,221 B1 | | 11/2001 | van de Loo |
| 6,325,518 B1 | * | 12/2001 | Whitehead et al. |
| 6,390,635 B2 | * | 5/2002 | Whitehead et al. |
| 6,394,616 B1 | * | 5/2002 | Foote et al. |
| 6,439,730 B1 | * | 8/2002 | Foote et al. |
| 6,497,491 B2 | * | 12/2002 | Boddy et al. |
| 6,505,943 B1 | * | 1/2003 | Olijnyk et al. |
| 6,582,087 B2 | * | 6/2003 | Whitehead et al. |
| 6,726,337 B2 | * | 4/2004 | Whitehead et al. |
| 2001/0046093 A1 | | 11/2001 | Foote et al. |

FOREIGN PATENT DOCUMENTS

| | | |
|---|---|---|
| WO | WO 00/78573 A1 | 12/2000 |
| WO | WO 01/28812 A1 | 4/2001 |

* cited by examiner

*Primary Examiner*—Ricky D. Shafer
(74) *Attorney, Agent, or Firm*—Warn, Hoffmann, Miller & LaLone, P.C.

(57) ABSTRACT

An exterior rear vision mirror assembly (10) for a motor vehicle, the assembly (10) having a base (14) to be attached to the vehicle, at least one arm (15, 16) extending from the base (14) and a mirror head (11) mounted to the at least one arm (15, 16) and having a mirror (13), the mirror head (11) and arm (15, 16) is adapted to be rotated about an axis in the base (14), a power fold system having a motor assembly (24) in the at least one arm or each arm (15, 16) to drive the mirror (13) from a driving position to a foldaway position and from the foldaway position to the driving position and an override system including a clutch (64) is provided so that the mirror (13) can be manually moved to the foldaway position.

22 Claims, 11 Drawing Sheets

POWER FOLD MECHANISM FOR DOUBLE ARM MIRRORS

FIELD OF INVENTION

This invention relates to power fold mechanisms for external rear vision mirrors for motor vehicles and it particularly relates to mirrors of the double arm type.

BACKGROUND OF THE INVENTION

For larger motor vehicles and small trucks it is desirable to have a large rear vision mirror and these are known to be mounted on a double arm system where the arms extend from a mirror base to a large mirror head.

It is desirable at times however that the width of a vehicle with such mirrors may be reduced and hence it is known to have such arms pivoting about a pivot axis substantially within the base so that the mirror can be folded back against the side of the vehicle to reduce the overall width.

It is desirable, too, that such a folding mechanism can be achieved electrically or power operated to avoid the necessity of an operator opening a window, perhaps in adverse weather conditions, to fold the mirror. In other situations where the vehicle must fit through or into tight situations such as parking, or garaging a vehicle, or washing and drive through services, it is also desirable to have a power operated folding mechanism to avoid the necessity for a driver to have to get out of the vehicle to fold the mirror on the passenger side as well as the driver's side.

It is objection therefore of this invention to provide such a power fold system.

BRIEF DESCRIPTION OF THE INVENTION

In one form, the invention is said to reside in an exterior rear vision mirror assembly for a motor vehicle, the mirror assembly being of a type having a base to be attached to the vehicle, at least one arm extending from the base and a mirror head mounted to the at least one arm to be supported thereby and a mirror in the mirror head, the mirror head and arm or arms adapted to be rotated about an axis in the base to a foldaway position, a power fold system having a motor assembly in the at least one arm or each arm to drive the mirror from a driving position to the foldaway position and from the foldaway position to the driving position and an override system whereby the mirror can be manually moved to the foldaway position.

Preferably the mirror head and arm or arms is adapted to be moved manually or by impact from the driving position to a forward or rearward breakaway position and the power fold system is adapted to drive the mirror head and arms from the forward breakaway position to the driving position and from the rearward breakaway position or foldaway position to the driving position.

The override system may include a clutch system.

In an alternative form the invention may be said to reside in a power fold system for an exterior rear vision mirror for a motor vehicle, the mirror being of a type having a base in use to be attached to the vehicle, two arms extending from the base and a mirror head mounted to the two arms to be supported thereby, the mirror head and arms adapted to be rotated about a pivot axis in the base to a foldaway position, the power fold system being characterised by including a motor assembly in each arm to drive the mirror from a driving position to the foldaway position and from the foldaway position to the driving position and an override system whereby the mirror can be manually moved to the foldaway position.

Each motor assembly may include an electric motor and each motor assembly may be contained in a motor housing in the respective arm. Other forms of motor assembly such as compressed air may also be used.

Each motor assembly may have a through axle extending through the motor housing with the through axle being on the pivot axis of the mirror head and arms.

There may be upper and lower fixed mounts for the or each motor assembly to the base by clamping each through axle outside the motor assembly to the base whereby the through axles are fixed with respect to the base.

Each motor assembly may include a clutch mechanism whereby manual movement of the mirror to the forward or rearward breakaway position causes disengagement of the clutch mechanism.

The clutch mechanisms may be loaded by a spring arrangement with preferably the spring arrangement being a negative spring rate disc spring.

Each clutch mechanism may include ramped dogs or detents bearing against corresponding ramped dogs or detents on a drive gear whereby the ramped dogs or detents enable the force generated as the detents are rotated against each other to overcome the load on the clutch provided by the spring arrangement to enable the clutch to disengage.

Preferably each motor assembly is a double worm drive electric motor in which the electric motor drives a motor worm gear which drives a drive worm gear which in turn drives the drive gear. Ball bearing assemblies may be provided to take axial and tangential loads on both the motor and drive worm gears.

Preferably the detents on the clutch are circumferentially spaced apart from detents on the drive gear to give a delay angle upon rotational movement of the arm with respect to the mirror base whereby there is provided a delay in movement of the clutch until the respective detent on the clutch mechanism engages the corresponding detent on the drive gear. The delay angle may be arranged so that the delay occurs when the mirror is moved manually from the driving position to a forward foldaway position and so that there is no delay angle when the mirror is moved from the driving position to a rearward foldaway position whereby the clutch is caused to disengage immediately by inter-engagement of the detents on the clutch mechanism and drive gear.

Preferably there are evenly spaced respective detents on the clutch mechanism and the drive gear.

Preferably the clutch mechanism is fixed rotationally with respect to the mirror base but can move axially to disengage from the drive gear. To enable this the clutch mechanism may be mounted on a spline arrangement on the through axle.

There may be further included a spring loaded external detent bar in the base which is adapted to engage stops on the motor housing to limit movement at both a forward and a backward breakaway position. A central stop for the spring loaded external detent bar for preventing movement from the driving position to the forward breakaway position can also be used. The detent bar can include a roller to assist with movement over a ramp on the motor housing between the forward stop position and the central stop There may be further included a support arm on each axle which holds the detent bar off engagement with each motor housing.

There may be further included a current sensing circuit for each motor whereby during operation when the detent bar reaches one of the stops on the motor housing electrical load increase is detected and the motor is shut off.

When returning the mirror head to the driving position from the forward foldaway position to overcome the potential problem with motor cut out when reaching the opposite side of the central stop there may be provided a ramp on the motor housing to gradually move the detent bar out during recovery from the forward breakaway position. The roller on the detent bar or a friction reducing material on the surface of the motor housing may be used to reduce load on the motor during this operation.

BRIEF DESCRIPTION OF THE DRAWINGS

This then generally describes the invention but to assist with understanding and to understand the various operational stages of the power fold mechanism according to this invention reference will now be made to the accompanying drawings which show a preferred embodiment of the invention.

In the drawings.

DESCRIPTION OF PREFERRED EMBODIMENT

Figure 1:
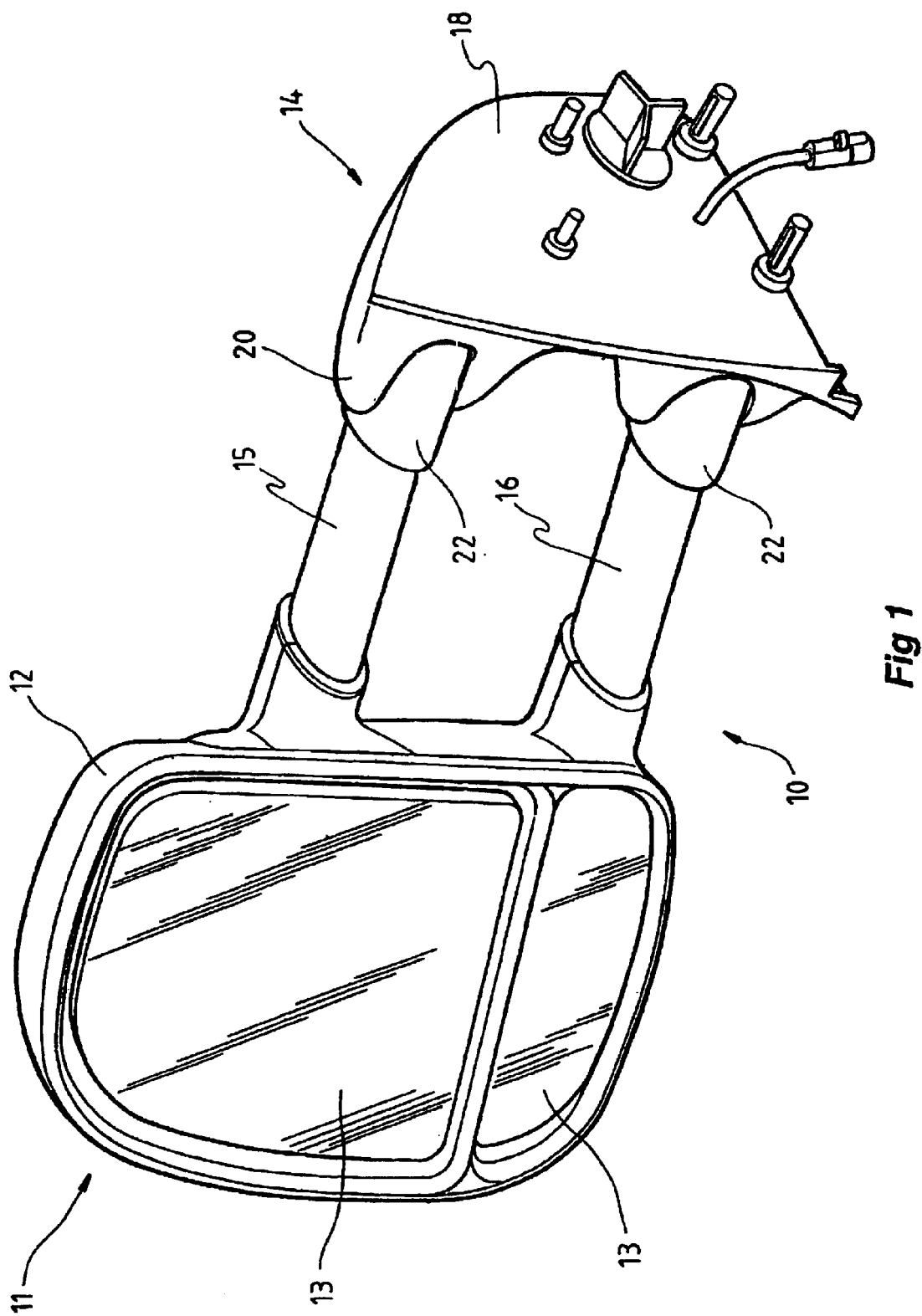
FIG. 1 shows an embodiment of a two arm rear vision mirror incorporating a power fold mechanism according to the present invention.

Now looking generally at the drawings and in particular FIG. 1 it will be seen that the external rear vision mirror for a larger motor vehicle or truck 10 includes a mirror head assembly 11 which comprises a head portion 12 and two mirrors 13. The mirrors 13 may be separately adjusted so that different portions of the road can be viewed. The mirror assembly 10 has a base assembly 14 with upper and lower mirror arms 15 and 16 respectively extending from the base assembly to the mirror head 11.

The base assembly 14 comprises a mirror base 18 and a base housing 20. Shrouds 22 are provided on the upper and lower arms to shroud the power fold motor assemblies as will be discussed later.

Figure 2:
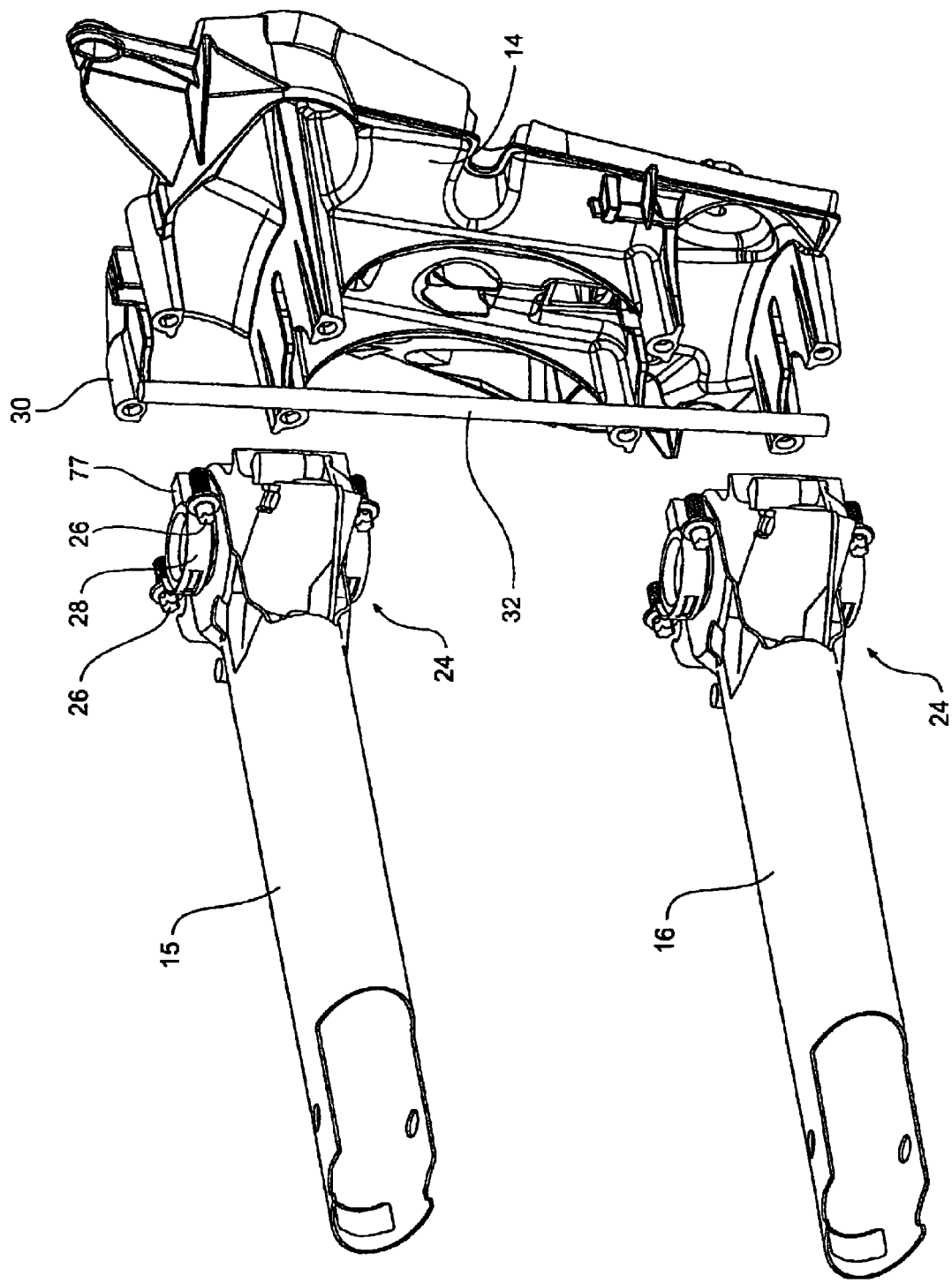
FIG. 2 shows a part exploded view of the mirror base and arms according to the embodiment shown in FIG. 1.
Figure 3:
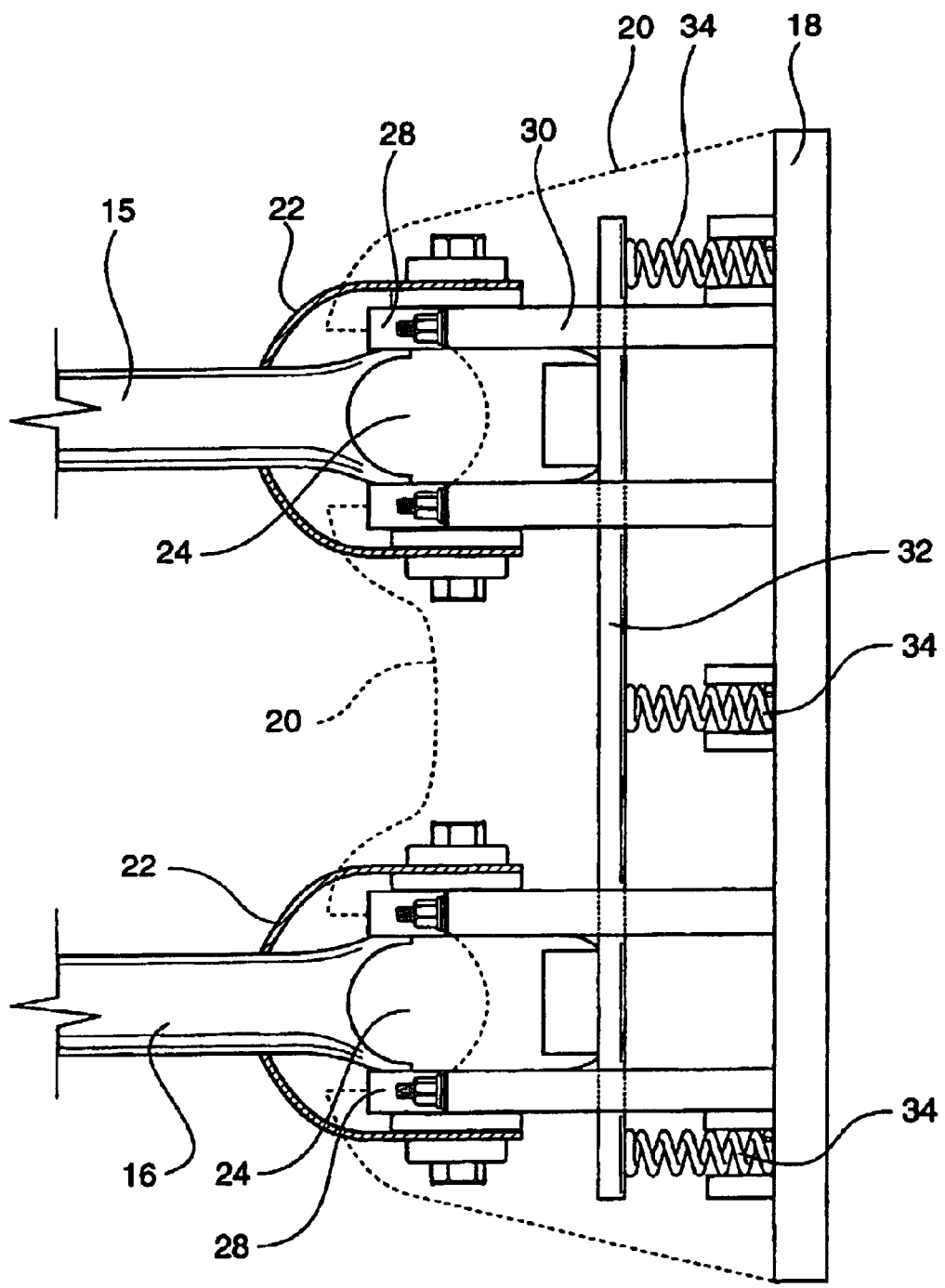
FIG. 3 shows a side cross-sectional view of the base and part of the arms.
Figure 4:
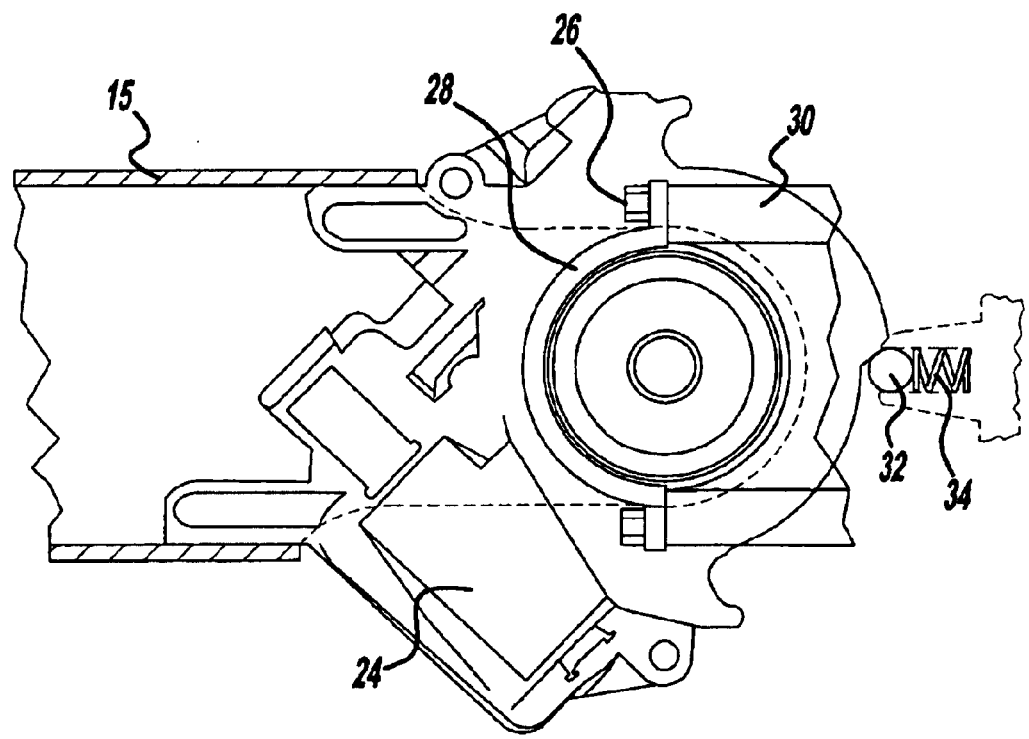
FIG. 4 shows a top view of one of the motor assemblies mounted in an arm.

FIGS. 2, 3, 4 show the base in some detail. In FIG. 2 the base housing 20 and the arm shrouds 22 have been removed to show clarity and the base and arms are separated or exploded to more clearly show the arrangement.

Each arm 15 and 16 has a motor assembly 24 mounted into it. The motor assemblies 24 are mounted into the base by means of bolts 26 holding U-shaped attachment straps 28 against projections 30 in the base 14. Also received in the base is a detent bar 32 which is urged outward by means of springs 34 at the top of the base at the centre of the base and at the bottom of the base. The detent bar 32 provides a stop when the arms are rotated as will be discussed later. The detent bar also provides a load to prevent forward breakaway.

Figure 6:
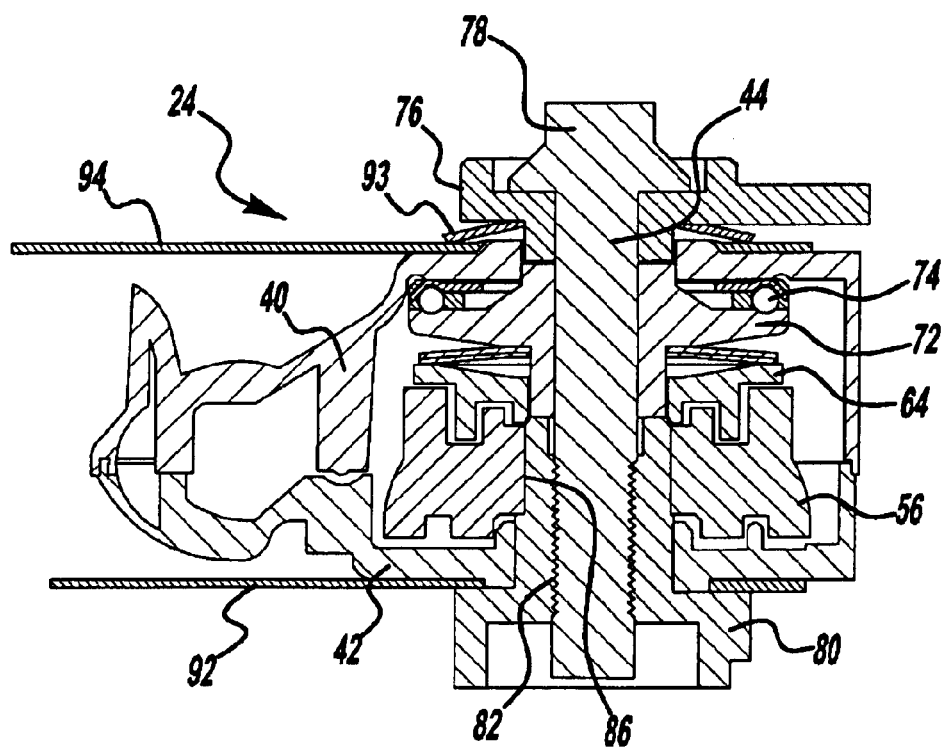
FIG. 6 shows a side cross-sectional view of the assembled motor assembly.
Figure 5:
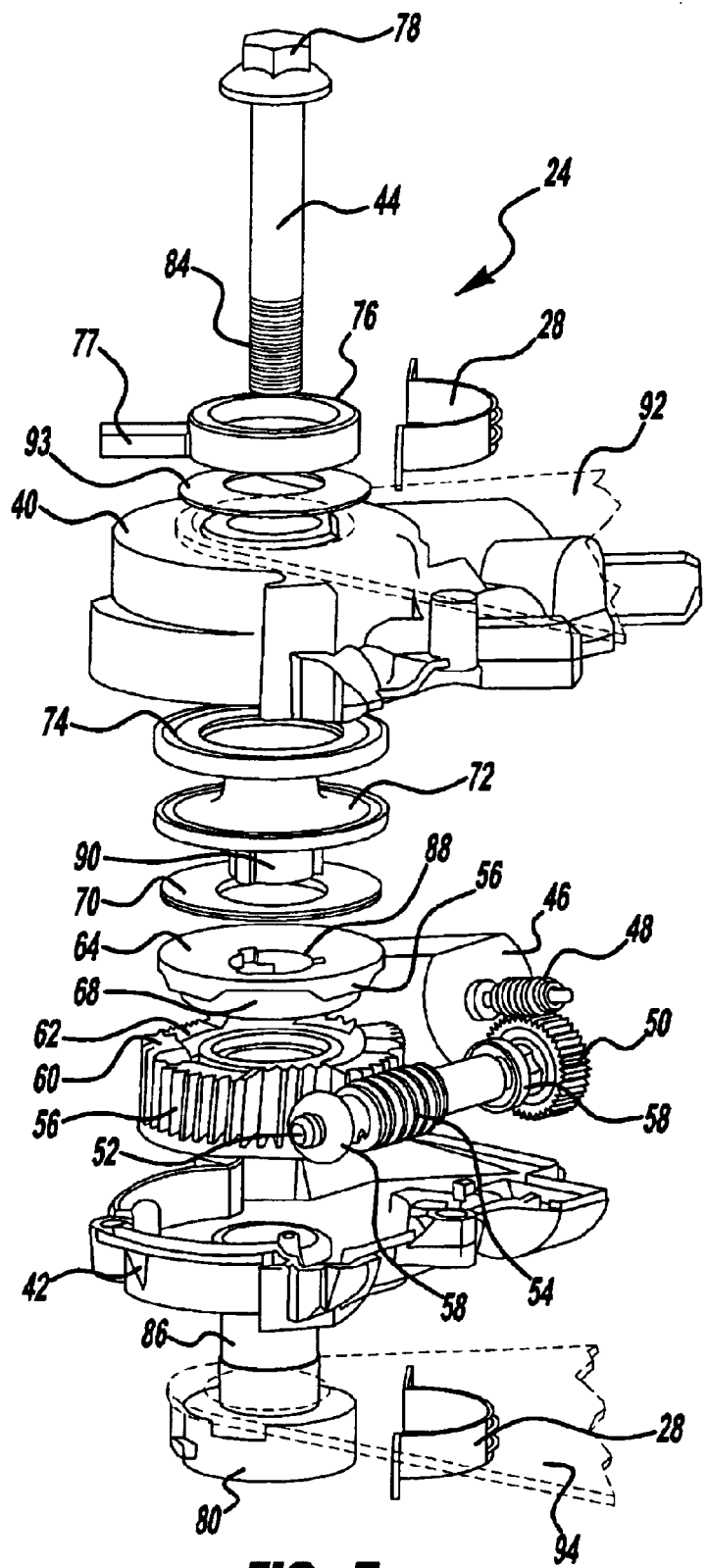
FIG. 5 shows an exploded view of the motor assembly showing the various components.

The motor assembly 24 is shown in breakaway view in FIG. 5 and in an assembled side cross-sectional view in FIG. 6. The motor assembly has an upper housing portion 40 and a lower housing portion 42 with a through bolt 44 holding the portions together and providing the central axis of rotation of the housing and hence the mirror arm to which it is attached.

Within the motor assembly 24 is a motor 46 which when operated drives a motor worm 48 on which is a motor worm gear 50 which acts on drive shaft 52 and drives a drive worm 54. The drive worm drives a drive gear 56. The drive shaft 52 has bearing races 58 at each end thereof with the bearing races taking both axial and tangential loads caused by the drive gear 56 reacting to the drive worm 54.

The drive gear 56 has four detents 60 on its upper surface and four drive gear recesses 62 between the drive gear detents. A clutch 64 which engages against the drive gear 56 has four detents 66 and four clutch recesses 68 between the clutch detent 66. When the clutch is engaged the clutch detent 66 engages in the drive gear recesses 62 and the drive detents 60 engage in the clutch recesses 68.

The clutch 64 is held into engagement with the drive gear 56 by means of clutch spring 70. The spring 70 bears against reaction member 72. The motor housing assembly 40 and 42 is separated from the reaction member 72 by means of bearing race 74 and the reaction member 72 engages directly against upper support member 76 into which the head 78 of the bolt 44 engages. The upper support member 76 has a support arm 77 and the U-shaped attachment strap 28 engages around the upper support member 76.

A lower support member 80 has a threaded longitudinal aperture 82 into which threads 84 on bolt 44 are engaged. The lower support 80 also provides a cylindrical bearing surface 86 upon which the drive gear 56 runs.

The actual axle about which the motor housing rotates is therefore provided by the lower support 80, the upper support 76 and the reaction member 72 all of which are held together by the through bolt 44. The upper support 76 and the reaction member 72 have interengaging lugs to prevent relative rotation.

The clutch is able to move longitudinally within the motor housing because it has a splined aperture 88 which can move up and down on splined shaft 90 on the reaction member 72. The mirror arm 15 as can be seen in FIG. 7A includes upper and lower flanges 92 and 94 which are engaged underneath the upper and lower supports 76 and 80 to be fixed in relation to the motor housings 40 and 42 respectively but to allow the supports to be fixed with respect to the mirror base.

The upper support 76 holds stability disc spring 93 tight against the upper arm flange 94 wedging it against a conical boss on the upper portion 40 of the motor housing to provide an anti slop joint between the arm and housing. The disc spring 93 also provides the reaction force to clamp the housing to the reaction member 72 through bearing race 72 thereby providing a low friction pivoting joint for the mechanism. This again makes the joint able to be driven by a small motor and reduces vibration induced image displacement in the mirror glass in the mirror by elimination of slop.

This then describes the constructional features of the power fold mirror according to this invention and the operation of the power fold system and manual folding arrangement will now be discussed in relation to FIGS. 7A to 7L.

Figure 7A:
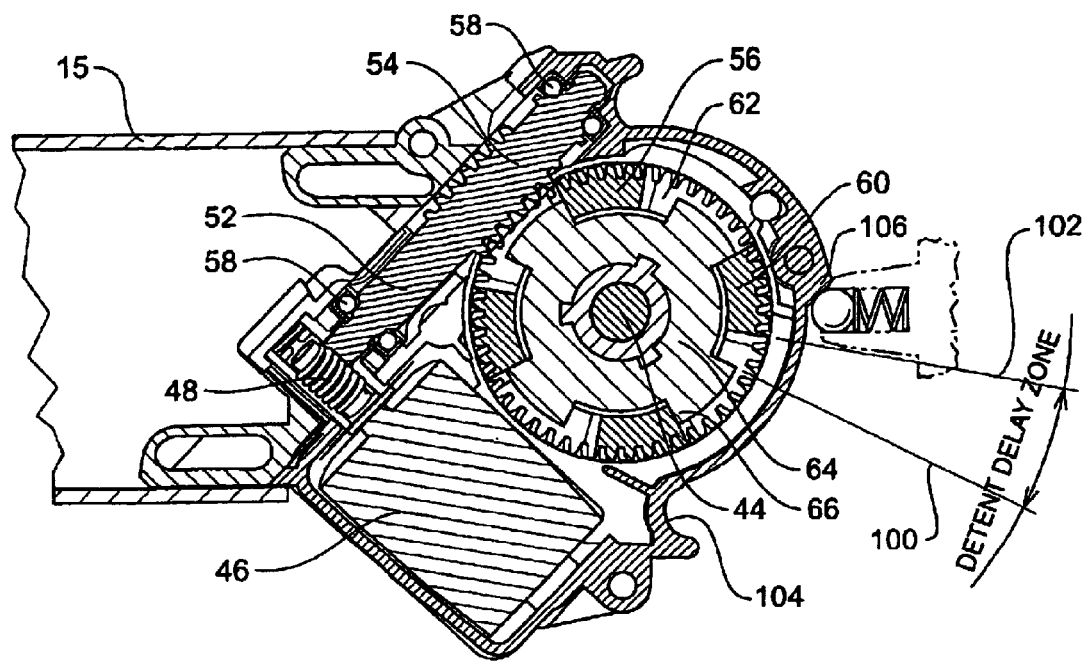
FIGS. 7A to 7L show a cut-away view of the motor assembly and part of the arm at the various stages of power fold and manual movement and return as will discussed in detail.
Figure 7B:
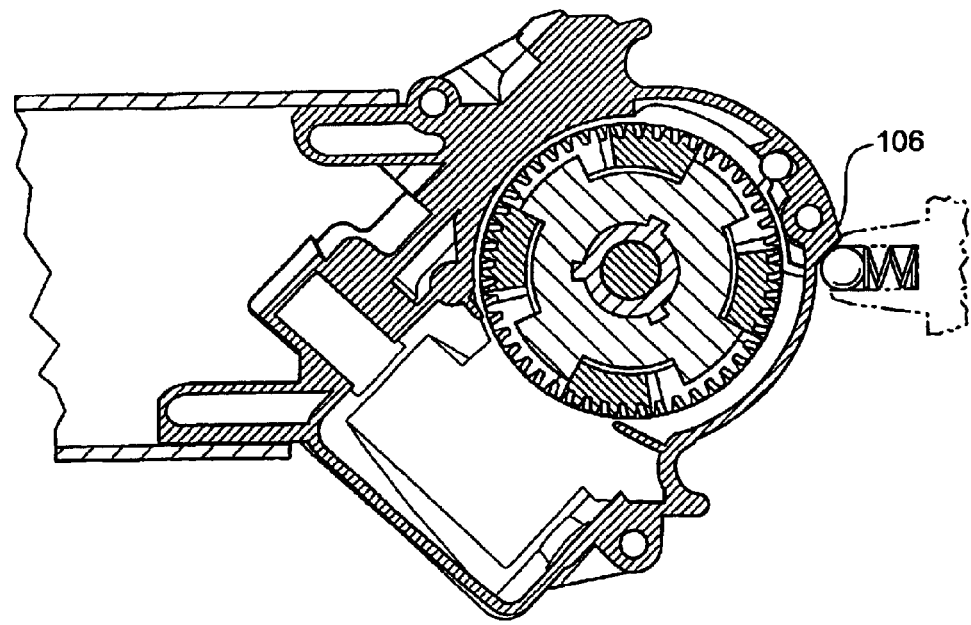
Figure 7C:
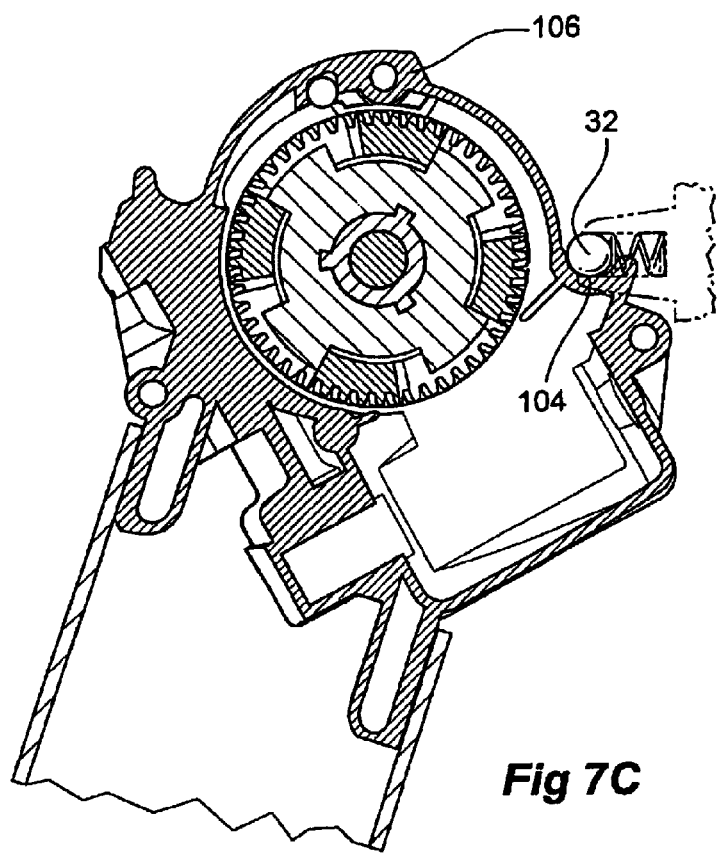

Generally FIGS. 7A to 7C show the various stages between the rest period when the mirror is deployed in the driving position to FIG. 7C where the mirror is in the foldaway or park position. The power movement from the fold away position shown in FIG. 7C to the deployed position in FIG. 7A is shown in the reverse order.

FIGS. 7C to 7F show the sequence of operations with a manual return from the park or foldaway position to the deployed driving position.

Figure 7D:
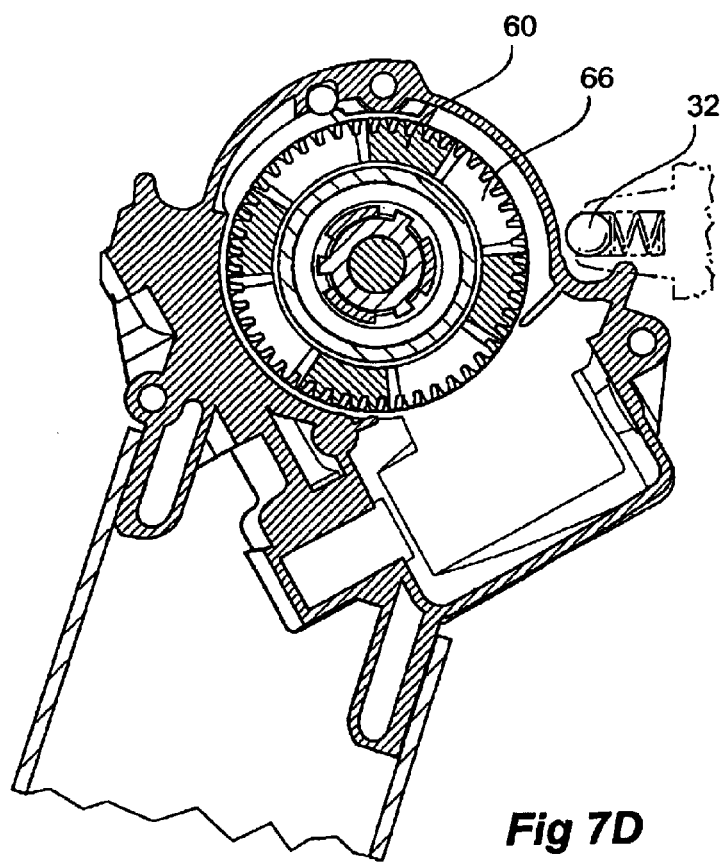
Figure 7E:
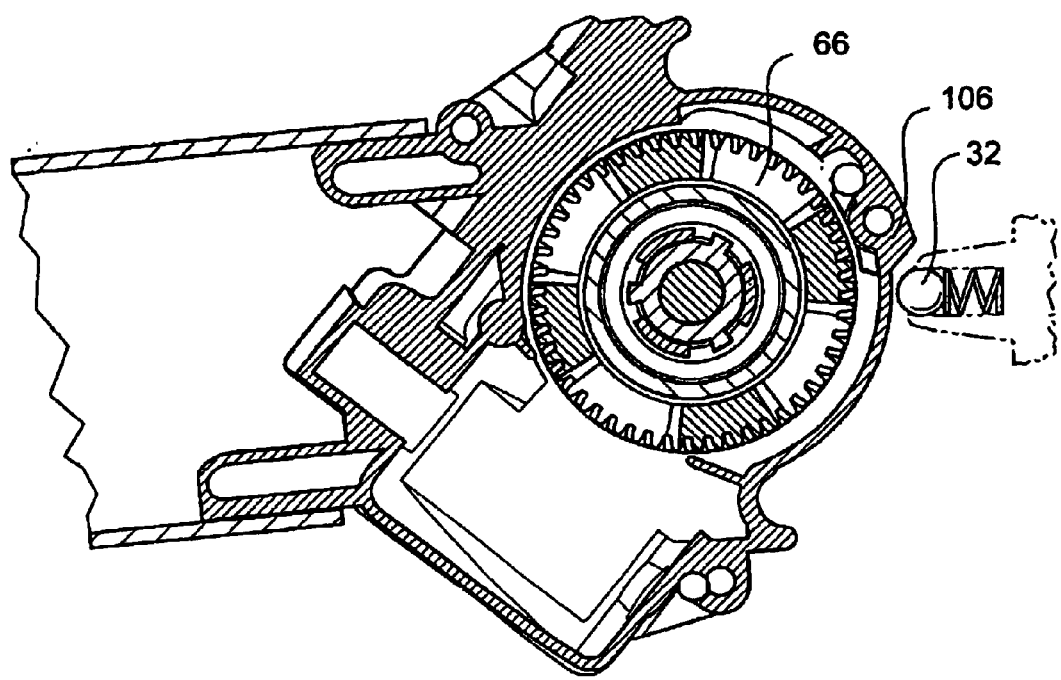
Figure 7F:
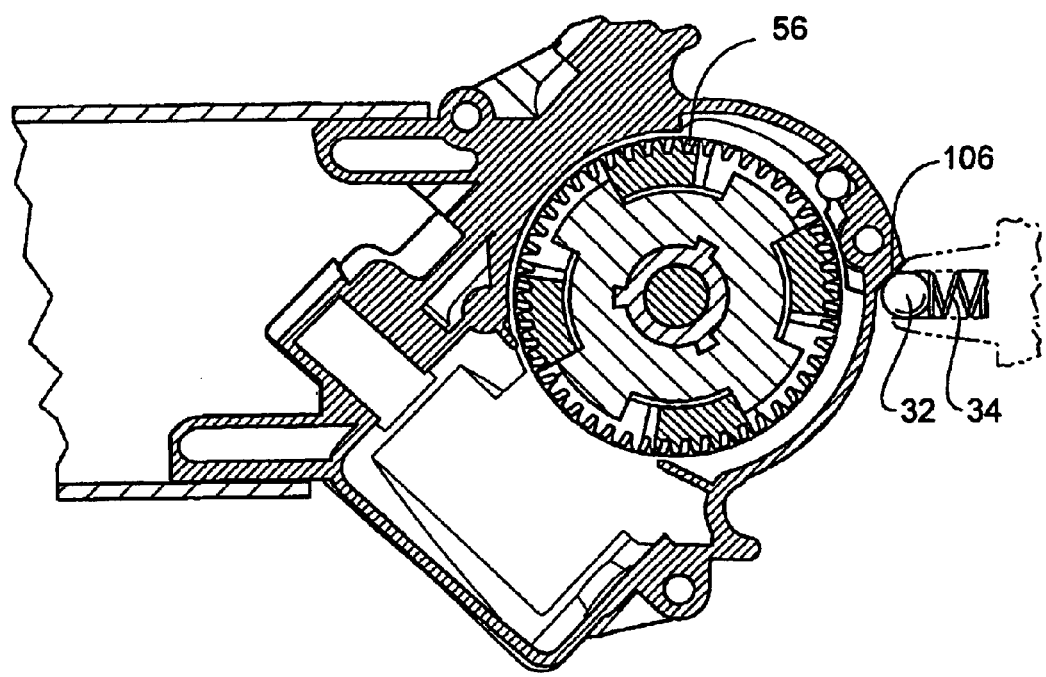
Figure 7G:
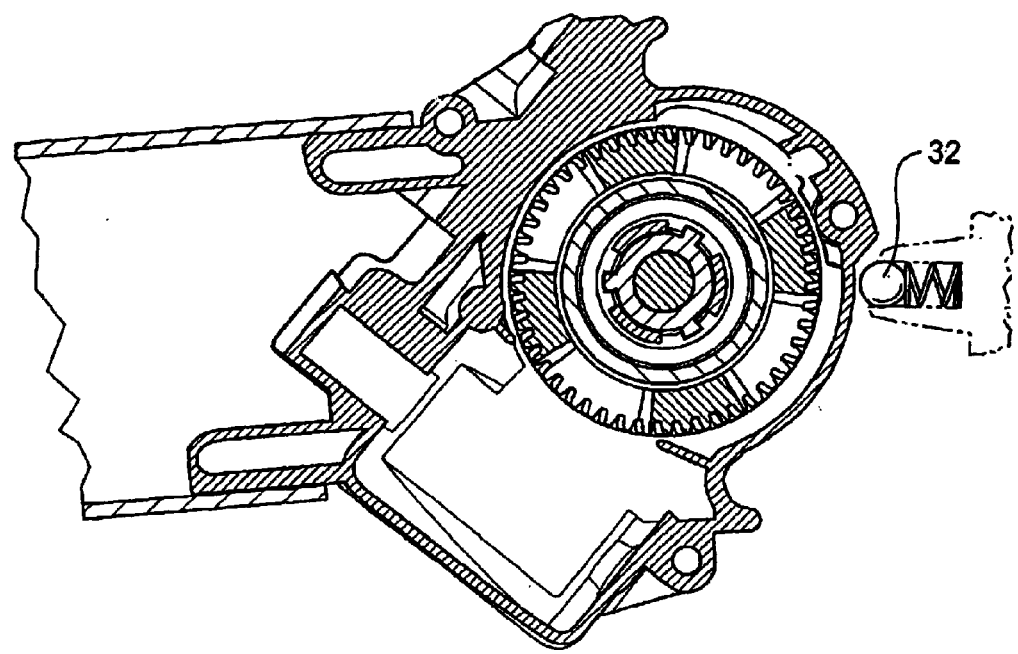
Figure 7H:
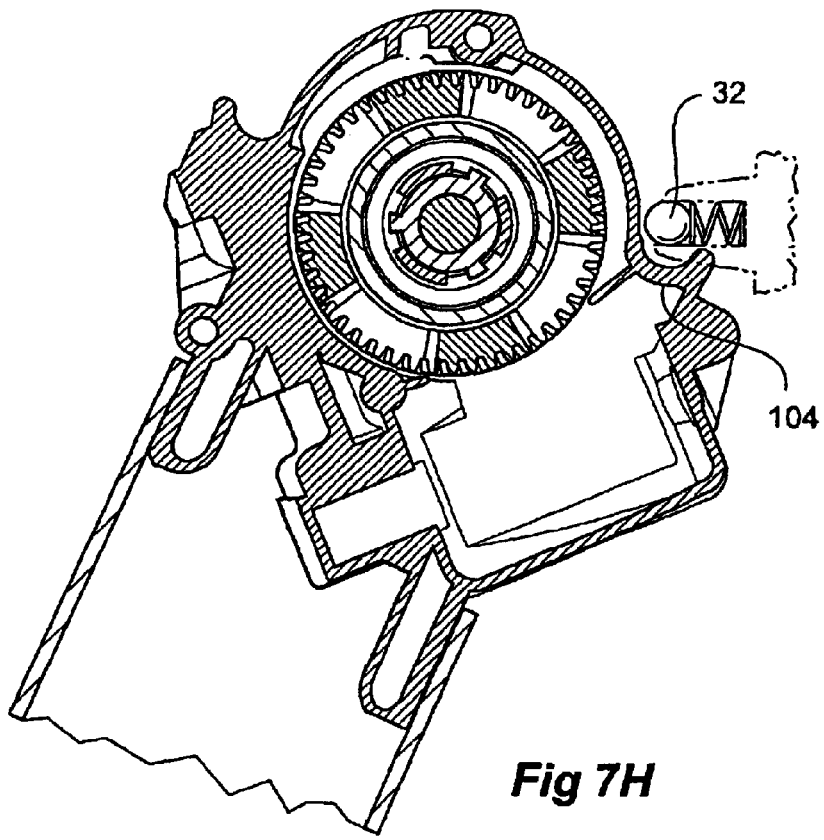
Figure 7I:
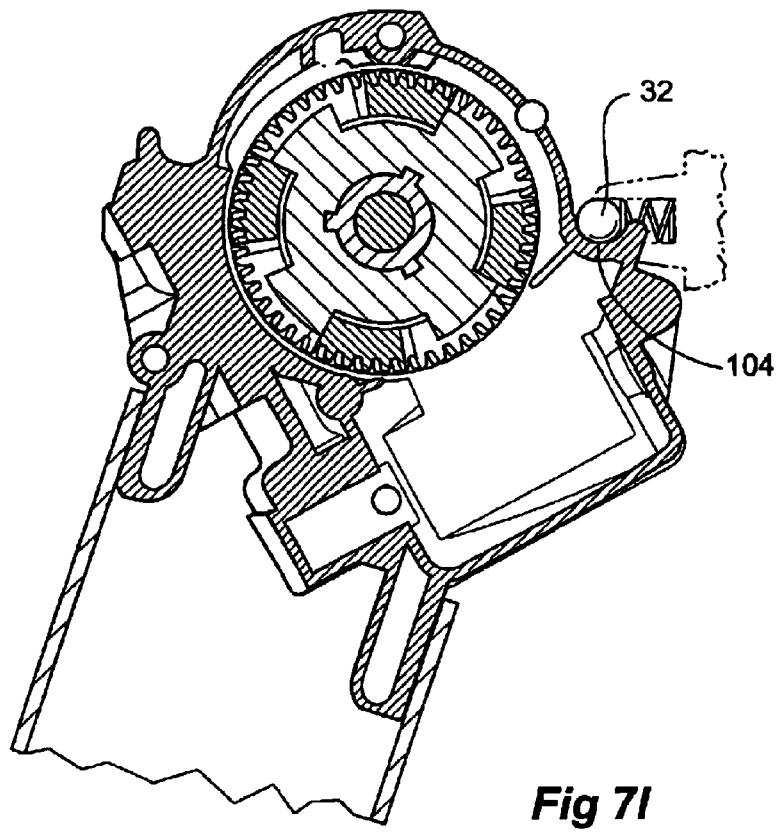

FIGS. 7G to 7I show the sequence of operations with a manual fold into the park position.

Figure 7J:
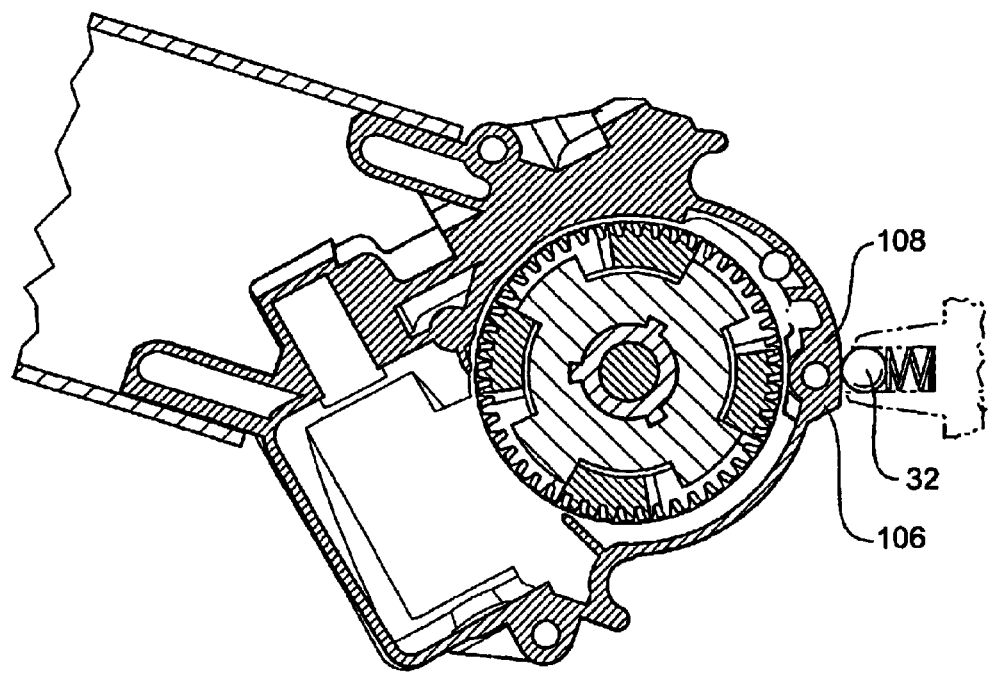
Figure 7K:
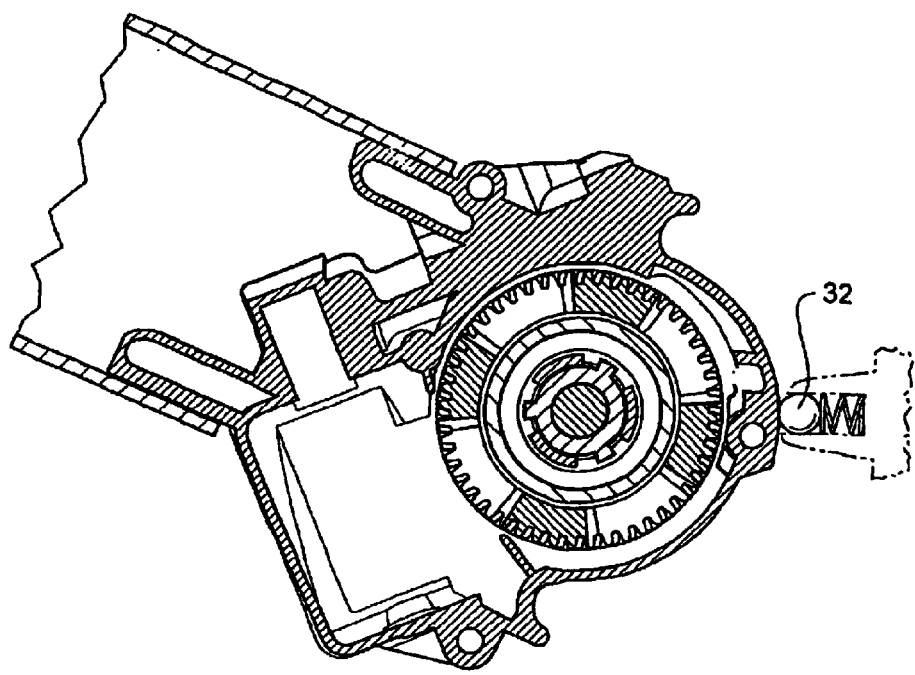
Figure 7L:
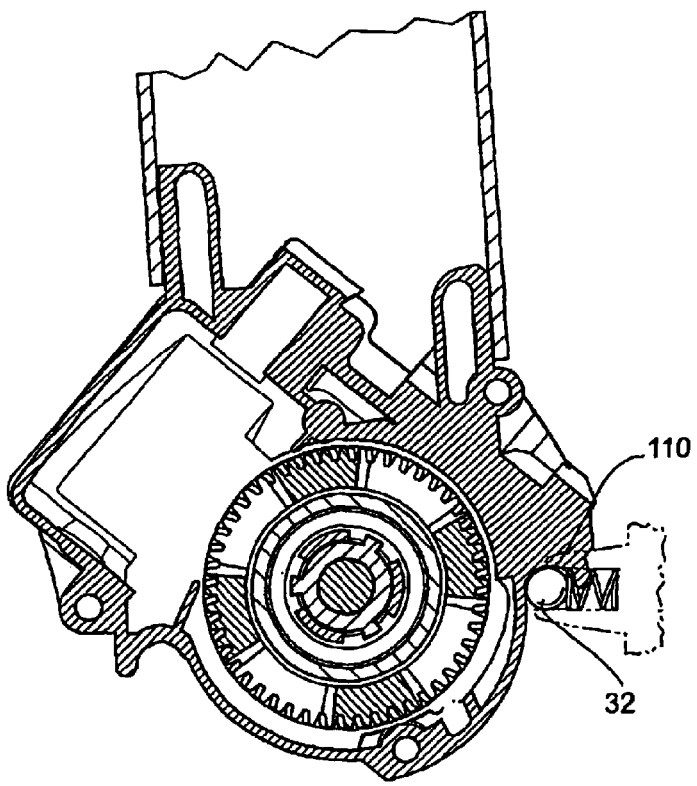

FIGS. 7J to 7L show the sequence of operations in a manual movement from the drive position to forward breakaway position.

FIGS. 7L through 7J, 7C to FIG. 7A show the sequence of steps necessary for a power fold recovery from the forward breakaway position to the deployed or driving position.

In FIG. 7A the detent delay zone is shown as the angle between lines 100 to 102. When the motor 46 is activated to move the mirror to the foldaway position the drive gear 56 is driven in a clockwise direction so that the first action is that the detent delay zone is taken up to the position shown in FIG. 7B. In this stage the worm drive 54 has forced the drive gear 56 to rotate through the delay zone until it is held stationary in effect to the mirror base via the clutch. This is because the drive gear detent faces are in contact with the clutch detent faces and the clutch is held stationary to the mirror base via the splines between the clutch and the reaction member 72.

Further rotation of the worm gear 54 causes the motor housing and arm 15 to move anticlockwise around the bolt shaft 44 until the detent bar engages with the park position stop 104 on the outside of the motor housing. As the mirror head approaches the park position the external detent bar attached to the mirror base comes in close contact to the mirror head park position travel stop 104 and stalls the mechanism. Any backlash in the mechanism taken out by the action of the worm driven gear chain wedging the mirror head up to the mirror base between the end thrust of the worm drive and the pivot centre and the external detent bars. This stabilises the mirror head to the mirror base by restricting any movement caused by running clearances in the folding system.

In the reverse operation from the park position to the driving position the action is shown from FIGS. 7C to 7A. The electric motor 46 driving the double worm gear arrangement rotates the mirror head around the drive gear 56 towards to the deployed driving position. The force to rotate the mirror head is applied through the end thrust of the worm drive 52 via the ball bearings and races 58. The worm drive 52 has forced the drive gear 56 to rotate through the delay zone until it is held stationary to the mirror base or in fact the clutch. The stationary condition is produced via the drive gear detent faces that are in contact with the clutch detent faces as the clutch is fixed with relation to the mirror base.

As the mirror head approaches the deployed driving position the external detent bar 32 attached to the mirror base comes into contact with the stop 106 on the outside of the motor housing which stalls the electric motor. Any backlash in the electric motor or mechanism taken up by the action of the motor driven gear chain wedging the mirror head up to the mirror base between the end thrust of the worm drive 52 and the external detent bar 32. As load increases the current sensing circuit detects the current increase and shuts off the motor 46. This stabilises the mirror head to the mirror base by restricting any movement caused by running clearances in the folding system which could contribute vibration induced image displacement on the mirror. If the mirror is in the parked or foldaway position as shown in FIG. 7C then it can be manually returned to the deployed driving position shown in FIG. 7A and FIG. 7F.

External force applied to the mirror head is transferred to the drive gear 56 via the non-back driving worm drive forcing the drive gear to turn against the clutch which is fixed to the mirror base via the splines on the clutch. The gear drive detents 60 cause the clutch detent 66 to lift against the load of the spring 70. It will be noted therefore that in effect the mirror head is retained in a detent in the parking or foldaway position. Further rotation of the mirror head as shown in FIG. 7D forces the faces of the clutch detents 66 to begin to contact with the drive gear detent faces 60. The detents move over each other until the detent on the clutch drop in to the next available detent on the drive gear. At this stage as shown in FIG. 7E the disc spring 70 forces the clutch detents 66 to engage with the drive gear detents 60 and the central stop 106 engages against the external detent bar 32. This again gives a stable connection between the mirror head and base for travel.

If it is desired to manually fold the mirror in then the series of steps shown from FIGS. 7F to 7I are necessary.

External force is applied to the mirror head in a counter-clockwise direction and the force is transferred to the drive gear 56 via the non-back driving worm drive 52 forcing the drive gear 56 to turn against the clutch 64 which as discussed above is fixed to the base of the mirror via the splines. The respective detents cause the clutch to lift compressing the disc spring 70. Further rotation causes the faces on the clutch detents to begin to contact with faces on the drive gear detents as shown in the transition from FIGS. 7G to 7H. Further rotation as shown between FIGS. 7H and 7I causes the respective detents to re-engage and forces the stop 104 to engage with the external detent bar 32. This gives a stable detented park position between the mirror head and mirror base.

A manual forward fold is shown from the deployed position as shown in FIG. 7A to FIGS. 7J to 7L. External load in the forward direction causes the external detent bar 32 which is engaged against the central stop as shown in FIG. 7F to compress the springs 34 so that the detent bar 32 can move past the central stop 106 and then the external detent bar 32 runs along the deploy position ramp 108 as shown in FIG. 7K. As this is occurring the non-back driving worm drive 52 forces the drive gear to rotate through the detent delay zone. It should be noted that the detenting action of the central stop 104 is completely overcome before the drive gear detent face contacts the clutch detent face. This ensures the forward folding load does not become excessive and is similar to the rearward folding load.

Continued external force towards to the forward breakaway position continues to force the drive gear to turn against the clutch such that the drive gear detents cause the clutch detents to lift compressing the disc spring 70. This movement of the detents against the spring produces a secondary load during the initial part of the forward folding.

Further forward folding causes the mirror head stop 110 to engage the detent bar 32 as shown in FIG. 7L.

The final action is to electrically recover from the manual forward fold position.

This is done as a series of steps from the position shown in FIG. 7L to the position shown in FIG. 7A to the position shown in FIG. 7C and then back to the position shown in FIG. 7A again. From the position as shown in FIG. 7L the motor 44 acts through the double worm drive to drive gear 56. As the drive gear 56 is engaged with the clutch 64 the drive gear stays stationary and the motor housing moves anticlockwise so that the detent bar 32 moves towards and engages the ramp 108. As the ramp angle is very shallow insufficient load is provided to the motor to cause it to cut out or stall and the detent bar 32 passes over the central stop 106 until it is in the position as shown in FIG. 7A. At this stage, however, there is no load to stop the mirror head movement and the mirror head continues movement until the stop 104 engages the detent bar 32. At this stage the motor is caused to stop by overload sensing. A vehicle internal witch can then be activated to restart the motor in the opposite direction and the motor then moves the mirror head back to the driving position as discussed above for the power deploy action.

Throughout this specification various indications have been given to the scope of the invention but the invention is not limited to any one of these but may reside in two or more combined together. The examples are given for illustration only and not for limitation.

What is claimed is:

1. A power fold system for an exterior rear vision mirror for a motor vehicle, the mirror comprising:
   a base in use to be attached to the vehicle, two arms extending from the base and a mirror head mounted to the two arms to be supported thereby, the mirror head and arms adapted to be rotated about a pivot axis in the base to a foldaway position, the power fold system including a motor assembly in each arm to drive the mirror head from a driving position to the foldaway position and from the foldaway position to the driving position and an override system whereby the mirror head can be manually moved to the foldaway position.

2. A power fold system for an exterior rear vision mirror as in claim 1 wherein each motor assembly includes an electric motor.

3. A power fold system for an exterior rear vision mirror as in claim 2 wherein each motor assembly is a double worm drive electric motor in which the electric motor drives a motor worm gear which drives a drive worm gear which in turn drives a drive gear.

4. A power fold system for an exterior rear vision mirror as in claim 3 wherein ball bearing assemblies are provided to take axial and tangential loads on both the motor and drive worm gears.

5. A power fold system for an exterior rear vision mirror as in claim 1 wherein each motor assembly is contained in a motor housing in the respective arm.

6. A power fold system for an exterior rear vision mirror as in claim 1 wherein each motor assembly has a through axle extending through a motor housing with the through axle being on the pivot axis of the mirror head and arms.

7. A power fold system for an exterior rear vision mirror as in claim 6 having upper and lower fixed mounts for attaching each motor assembly to the base by clamping each through axle outside the motor assembly to the base whereby the through axles are fixed with respect to the base.

8. A power fold system for an exterior rear vision mirror as in claim 1 wherein each motor assembly includes a clutch mechanism whereby manual movement of the mirror to a forward or rearward breakaway position causes disengagement of the clutch mechanism.

9. A power fold system for an exterior rear vision mirror as in claim 8 wherein each clutch mechanism is loaded by a spring arrangement.

10. A power fold system for an exterior rear vision mirror as in claim 9 wherein the spring arrangement is a negative spring rate disc spring.

11. A power fold system for an exterior rear vision mirror as in claim 10 wherein each clutch mechanism includes ramped dogs or detents bearing against corresponding ramped dogs or detents on a drive gear whereby the ramped dogs or detents enable a force generated as the detents are rotated against each other to overcome a load on the clutch provided by the spring arrangement to enable the clutch to disengage.

12. A power fold system for an exterior rear vision mirror as in claim 11, wherein the detents on the clutch are circumferentially spaced apart from detents on the drive gear to give a delay angle upon rotational movement of the arm with respect to the base whereby there is provided a delay in movement of the clutch until the respective detent on the clutch mechanism engages the corresponding detent on the drive gear.

13. A power fold system for an exterior rear vision mirror as in claim 12 wherein the delay angle is arranged so that the delay occurs when the mirror head is moved manually from the driving position to a forward foldaway position.

14. A power fold system for an exterior rear vision mirror as in claim 12 wherein the delay angle is arranged so that there is no delay angle when the mirror is moved from the driving position to a rearward foldaway position whereby the clutch is caused to disengage immediately by interengagement of the detents on the clutch mechanism and the drive gear.

15. A power fold system for an exterior rear vision mirror as in claim 12 wherein there are evenly spaced respective detents on the clutch mechanism and the drive gear.

16. A power fold system for an exterior rear vision mirror as in claim 12 wherein the clutch mechanism is fixed rotationally with respect to the base but can move axially to disengage from the drive gear.

17. A power fold system for an exterior rear vision mirror as in claim 16 wherein the clutch mechanism is mounted on a spline arrangement on a through axle.

18. A power fold system for an exterior rear vision mirror as in claim 1 further including a spring loaded external detent bar in the base which is adapted to engage stops on a housing of the motor assemblies, the motor housing to limit movement at both a forward and a backward breakaway position.

19. A power fold system for an exterior rear vision mirror as in claim 18 further including a central stop for the spring loaded external detent bar for preventing movement from the driving position to the forward breakaway position.

20. A power fold system for an exterior rear vision mirror as in claim 18 further including a support arm on each axle which holds the detent bar off engagement with each motor housing.

21. A power fold system for an exterior rear vision mirror as in claim 18 wherein the detent bar includes a roller to assist with movement over a ramp on the motor housing between a forward stop position and a central stop.

22. A power fold system for an exterior rear vision mirror as in claim 18 further including a current sensing circuit for each motor whereby during operation when the detent bar reaches one of the stops on the motor housing an electrical load increase is detected and the motor is shut off.

* * * * *